United States Patent [19]

Tognazzini

[11] Patent Number: 5,739,512
[45] Date of Patent: Apr. 14, 1998

[54] DIGITAL DELIVERY OF RECEIPTS

[75] Inventor: Bruce Tognazzini, Woodside, Calif.

[73] Assignee: Sun Microsystems, Inc., Palo Alto, Calif.

[21] Appl. No.: 656,123

[22] Filed: May 30, 1996

[51] Int. Cl.⁶ .................................................. G06K 5/00

[52] U.S. Cl. ............................................. 235/380

[58] Field of Search .................... 235/375, 379, 235/380, 381, 383, 385; 902/24, 25

[56] References Cited

U.S. PATENT DOCUMENTS

5,465,206  11/1995  Hilt et al. ............................... 395/240
5,590,038  12/1996  Pitroda .................................. 235/380

Primary Examiner—F. L. Evans
Attorney, Agent, or Firm—Lowe, Price, LeBlanc & Becker

[57] ABSTRACT

Digital delivery of receipts overcomes many of the problems associated with paper receipts. Digital receipts can be delivered over a properitary or over an open network such as the Internet. They can be uploaded to a smart card. They can be standardized in format to facilitate automated processing. An e-mail address can be incorporated into a bank card or other machine readable and for automatic routing of the receipt to a payor's e-mailbox.

9 Claims, 8 Drawing Sheets

TO: customer@aol.com
CC: expense.reporter@aol.com
SUBJECT: RECEIPT

VENDOR NAME:
VENDOR ADDRESS:
VENDOR TAX ID:
DATE:
TIME:
RECEIPT NO.:
NUMBER IN PARTY:
BILL AMOUNT:
TAX AMOUNT:
TOTAL AMOUNT PAID:
HOW PAID:
DIGITAL SIGNATURE OF VENDOR:
DIGITAL SIGNATURE OF CUSTOMER:

Figure 8

DIGITAL DELIVERY OF RECEIPTS

BACKGROUND OF THE INVENTION

1. Field of the Invention

The invention relates to cash registers and other computer driven forms of recording monetary transactions, and more particularly to improvements in such devices which provide an electronic version of a receipt.

2. Description of Related Art

Individuals that need or desire to track expenses they incur while traveling are forced to retain and carry paper receipts. These paper items, including hotel, restaurant and rental car receipts, are often cumbersome, easily lost or misplaced, and often difficult to read days or weeks after they were issued to the traveler. A business traveler, for example, may accumulate a substantial number of these receipts over the course of a trip and then be faced with the time-consuming (and tiresome) task of organizing, categorizing and transcribing the dollar amounts in such a way as to enable him to complete an expense report. A receipt that has been lost or is unreadable results in an additional delay. Significant costs are associated with reconciling expense reports with paper receipts; the business must bear the overhead of their employee's time being spent obtaining a receipt, interpreting and transcribing the information contained in the receipt, and must absorb the costs of not knowing, in a timely and accurate fashion, its travel-related expense liability.

Providers of receipts have attempted to address some of the problems presented by paper receipts. Often, a paper receipt is conveniently organized. A hotel receipt, for example, may group similar items and provide subtotals for lodging, meals, and telephone calls. The use of computing technology speeds the preparation and payment of the bill, at which time a receipt can be quickly printed. It is also possible to have receipts mailed to an address specified by the traveler, obviating the need for the traveler to carry the receipt. These methods, however, are merely attempts to get a paper receipt to the traveler more quickly or conveniently and do not address the problems inherent in paper receipts.

Bank cards (e.g. credit or debit cards) are known in the art to be used for automated financial transactions. By using a digitally-encoded magnetic strip which contains the user's name and account number, the user is afforded access to computer networks by having the card "read" by a machine.

"Smart" cards store a wide variety of information in digital format. Such cards incorporate memory, one or more microprocessors, software and an interface to allow data transfers between the card and external devices. Smart cards are a significant advancement over magnetic stripe cards in that they can send and receive data, can manipulate the data via the microprocessor, and can be easily modified to adapt to changing needs.

Electronic Data Interchange (EDI) provides an effective way to communicate data seamlessly between different organizations. The concept of a "transaction set" (an agreed upon data format and an agreement as to what individual data elements mean) greatly simplifies the integration of electronic messages into existing, but disparate, computational infrastructures. Transactions sets may be "standard" ones devised and approved by a standards body such as the American National Standards Institute (ANSI) or proprietary ones designed by a consortium of tightly integrated businesses. Point-of-sale bank card authorization systems are an example of the use of EDI.

Electronic mail, using either an open network such as the Internet or a proprietary network, is a simple means of communicating digital information from one computer to another. EDI is, in effect, highly structured electronic mail. In addition to transmitting text-based (ASCII) information, electronic mail commonly transports a multitude of other data formats including graphics, binary files containing formatted text, and sounds.

Encryption techniques permit the secure transmission of electronic information. Well-known public/private key encryption schemes provides privacy and content security, while digital signature schemes provide for authentication of the sender. These techniques are well-understood and widely used in many applications, including electronic mail and EDI.

SUMMARY OF THE INVENTION

The present system provides apparatus, systems, processes and software which permits the elimination of paper receipts by storing or transmitting receipt information digitally for later use by the traveler. This can be implemented in at least three ways.

One approach is for the credit card of the traveler to have an electronic mail address encoded on the magnetic stripe which would be used by a business to send the receipt electronically.

Alternatively, a traveler would present a smart-card to a cashier and the electrically signed digital receipt would be loaded into the smart card. The traveler would then be able to access the information from the smart card when needed with an appropriate card reader.

Finally, when a traveler presented a bank card to a business for payment, the business would transmit a digital form of the receipt to the bank card company, digitally signed by the user. The credit card company would then, using an electronic mail address and the traveler's public encryption key stored in a data base, debit the account and send a receipt digitally using electronic mail. The credit card company would also retain the receipt information in a database for re-transmission, for audit or historical purposes.

The invention is directed to apparatus for handling purchase transactions, including a cash register and a card reader for reading cards which include at least one electronic mail address. When the cash register generates a receipt, a transmitter sends an electronic copy of the receipt to the electronic mail address. The electronic copy may be digitally signed by either the vendor, the customer or both before sending it to the electronic mail address. A customer's smart card may receive a copy of the digital receipt, process the digital signature and then return the signed receipt to the cash register for sending of the electronic receipts. The electronic receipt may be sent to the customer as well as to whomever prepares his or her travel vouchers. The electronic copy of the receipt may be in an electronic data interchange format.

The invention is also directed to apparatus for handling purchase transactions, including a cash register, and a card reader/writer for reading cards and activating the cash register to generate a receipt and for writing an electronic copy of the receipt to the card.

The invention is also directed to apparatus for processing electronic copies of receipts including a reader for reading a storage medium containing the copies, and a computer configured to process information contained in the copies to produce a report summarizing at least some of the receipts.

The invention is also directed to a method of processing purchase transactions, by capturing an electronic mail address when processing a payment card, generating a receipt, and sending a copy of the receipt to the electronic mail address.

The invention is also directed to a method of processing purchase transactions, by accumulating copies of electronic receipts on a portable memory medium, and processing information contained in the copies to produce a report summarizing at least some of the receipts.

The invention is also directed to a system for processing purchase transactions, including, a network and a plurality of merchant terminals connected to the network. At least one of the merchant terminals is configured to include a cardreader for reading payment information and an electronic mail address from a card and for sending receipt information to the electronic mail address. A plurality of customer terminals are also connected to the network. At least one of these is configured to retrieve receipt information from an electronic mail box having the electronic mail address and to process receipt information into a report summarizing purchase transactions.

The inventions is also directed to a method of processing purchase transactions, by receiving information about purchase transactions of a customer from at least one merchant at a central location, and by sending an electronic confirmation of the purchase transaction to the customer at an electronic mail address stored at the central location.

The invention is also directed to a system for processing purchase transactions including a network and a central computer, containing information about accounts of a plurality of customers and about electronic mail addresses of each customer, connected to the network. A plurality of merchant terminals are connected to the network for sending information about purchase transactions of the customers to the central computer. The central computer is configured to send an electronic receipt containing information about a purchase transaction to a customer at a respective electronic mail address of the customer.

The invention is also directed to computer program products, each including one or more memory media, and a computer program stored on the one or more memory media. The computer programs stored on the memory media implement the apparatus, systems and methods described above.

BRIEF DESCRIPTION OF DRAWINGS

The object, features and advantages of the system of the present invention will be apparent from the following descriptions, in which.

NOTATIONS AND NOMENCLURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
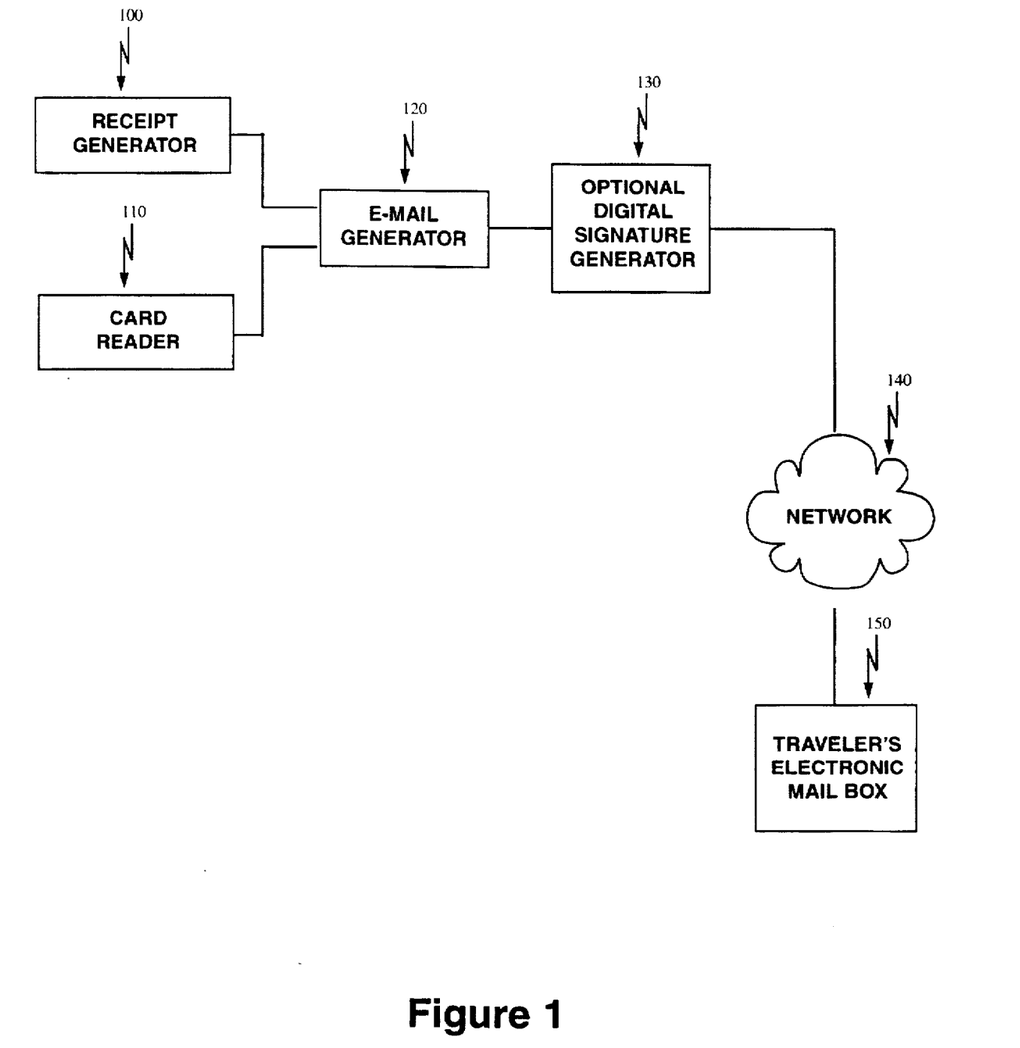
FIG. 1 is a functional illustration of a first form of implementing the invention.

FIG. 1 is a function illustration of a first form of implementing the invention. In a commercial transaction, once payment has been made, a receipt is generated. The information contained in the receipt typically varies from vendor to vendor as does the format of the information. Generation of a receipt is represented at 100. Note that payment can occur by any known means such as credit cards, debit cards, cash, check, electronic transfer or the like. A card reader is symbolically illustrated at 110. The card reader would scan a card of some type having stored thereon an electronic mail address for the delivery of receipts. The card itself could be a traditional credit card, a smart card, a magnetically encoded driver's license or any other computer readable card medium, the information on which has been supplemented to include an E-mail address for delivery of electronic receipts. An E-mail generator 120 assembles the information from the receipt generator and the card reader into an E-mail message suitable for transmission across a network 140. Network 140 can be a proprietary network or an open network such as the Internet. Item 130 indicates that optional digital signatures are generated and applied to the receipt information. Typically, this could be a digital signature of a vendor, by which the authenticity of the receipt would be assured for purposes of official agencies of the government as well as for the company for whom the traveler works. A digital signature of the customer may be applied as well to insure a credit card company that the receipt is authentic. The application of digital signatures as a mechanism for insuring authenticity of a document and that the document has not been changed using public key encryption techniques is well known in the art.

The electronic version of the receipt is sent to the traveler's electronic mail box 150. It may be desirable to send a copy of the receipt not only to the traveler but to the person who prepares the travel voucher for the traveler as a "carbon" copy.

Figure 2:
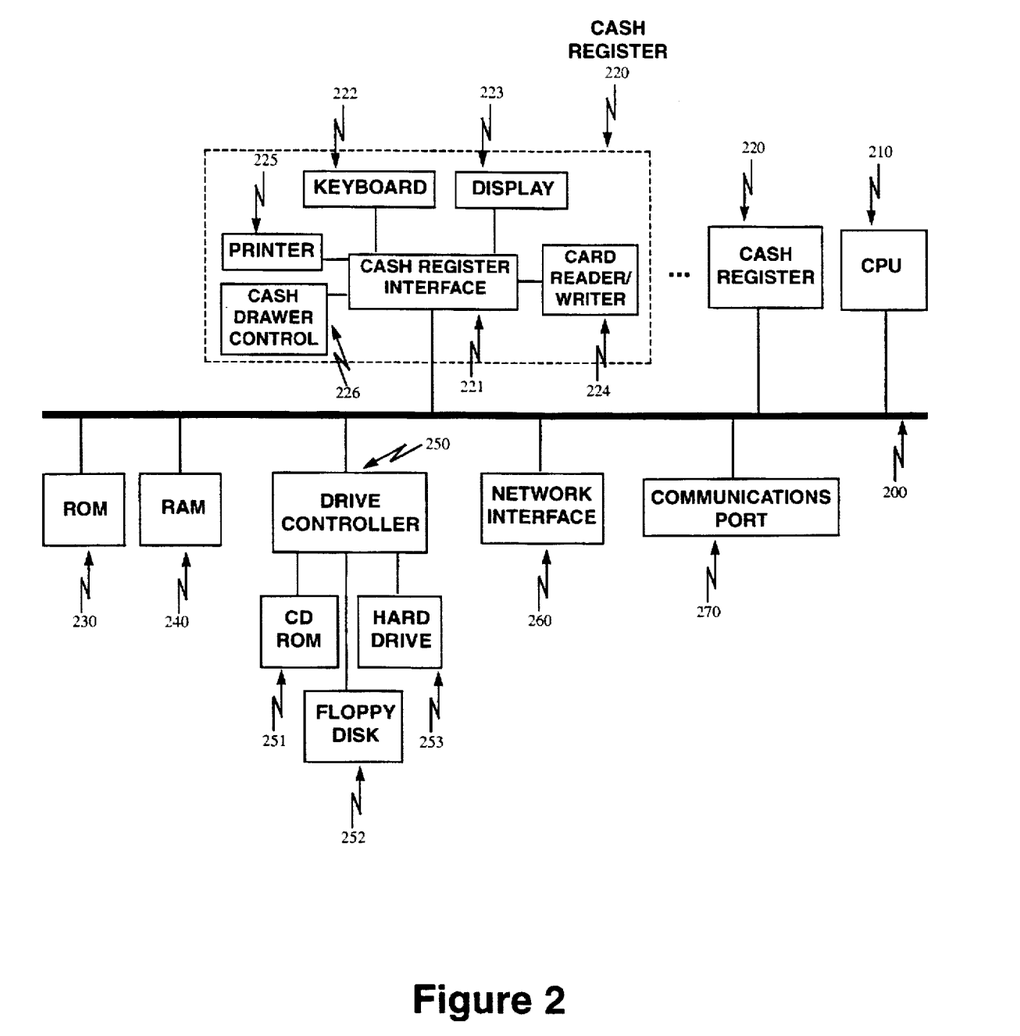
FIG. 2 is an exemplary hardware arrangement for carrying out the invention.

FIG. 2 is an exemplary hardware arrangement for carrying out the invention. FIG. 2 shows a plurality of cash registers 220 connected to a central processing unit 210 over a BUS 200. A typical cash register is equipped with a keyboard 222 and a display 223. A card reader/writer 224 is used for reading credit cards and, in some embodiments, for writing smart card information. Printer 225 is utilized for generating paper receipts in the traditional manner. Control of a cash drawer is illustrated at 226 and all of these devices are interfaced to the computer BUS over cash register interface 221.

Read only memory 230 contains, typically, boot strap routines and a basic input/output (BIOS) system utilized to initialize CPU 210 at start up. RAM 240 represents the main memory utilized for processing data. Drive controller 250 interfaces one or more disc type drives such as CD ROM 251, floppy disc drive 252 and hard discs 253. The number and type of drives utilized with a particular system will vary depending upon user requirements.

A network interface 260 permits communications to be sent to and received from a network. Communications port 270 may be used as an alternate means of communication or as a supplemental means of communication. That is, communications port 270 may be utilized for a dial-up connection to one or more networks whereas network interface 260 is a dedicated interface to a particular network.

Programs for controlling the operation of the apparatus shown in FIG. 2 are typically stored on a disk drive and then loaded into RAM for execution during the start-up of the computer.

Figure 3:
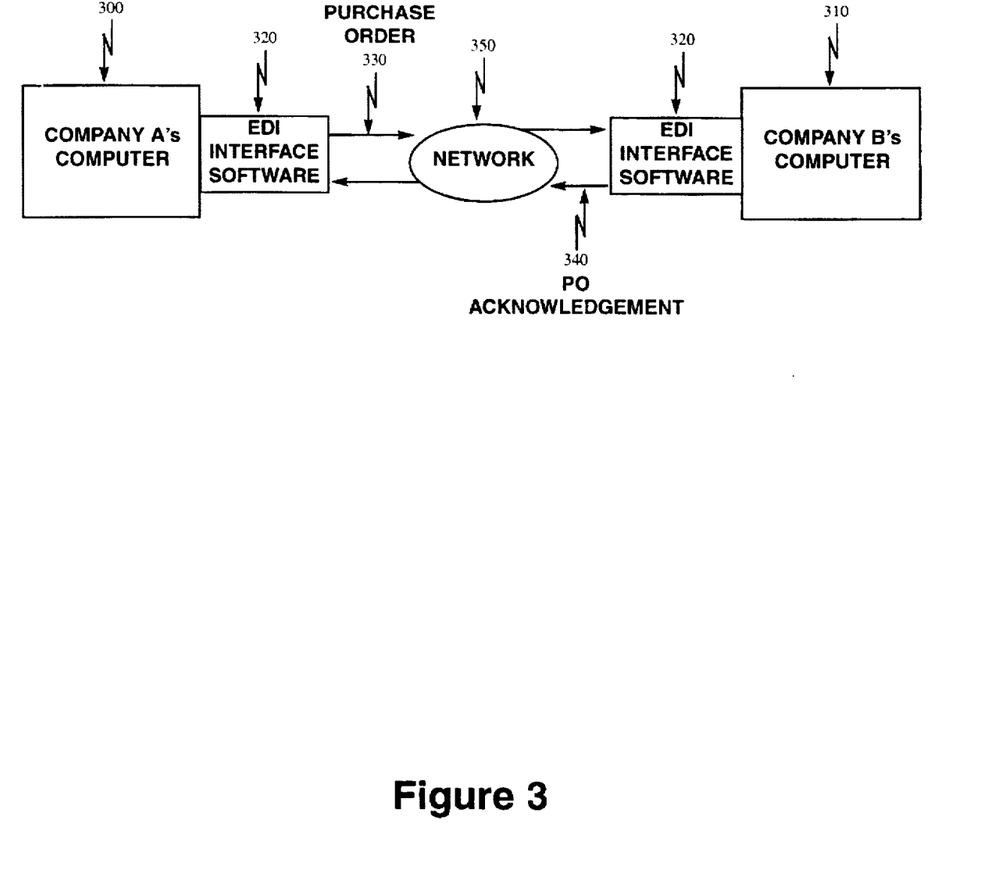
FIG. 3 illustrates an the concept of Electronic Data Interchange (EDI).

FIG. 3 illustrates the concept of Electronic Data Interchange (EDI). EDI is a method of transferring highly structured data automatically between disparate computer systems (300 and 301). By placing commercially available EDI software (320) as middleware between the computer and the incoming/outgoing data, it is possible to map the data contained within an EDI message to/from a company's internal databases. As long as both companies have agreed in advance on which EDI transaction sets (message structures) they intend to use, and have agreed what each data element means, it is possible for the computers to send and receive messages without human intervention. In the Figure, Company A's computer has sent a Purchase Order (330) to Company B's computer. Company B's computer has determined that the order can be fulfilled and has responded by sending an acknowledgment (340) to Company A's computer. Automated bank card authorizations are accomplished in the same manner and methodology is suitable for the generation, transmission and acknowledgment of electronic receipts.

Figure 4:
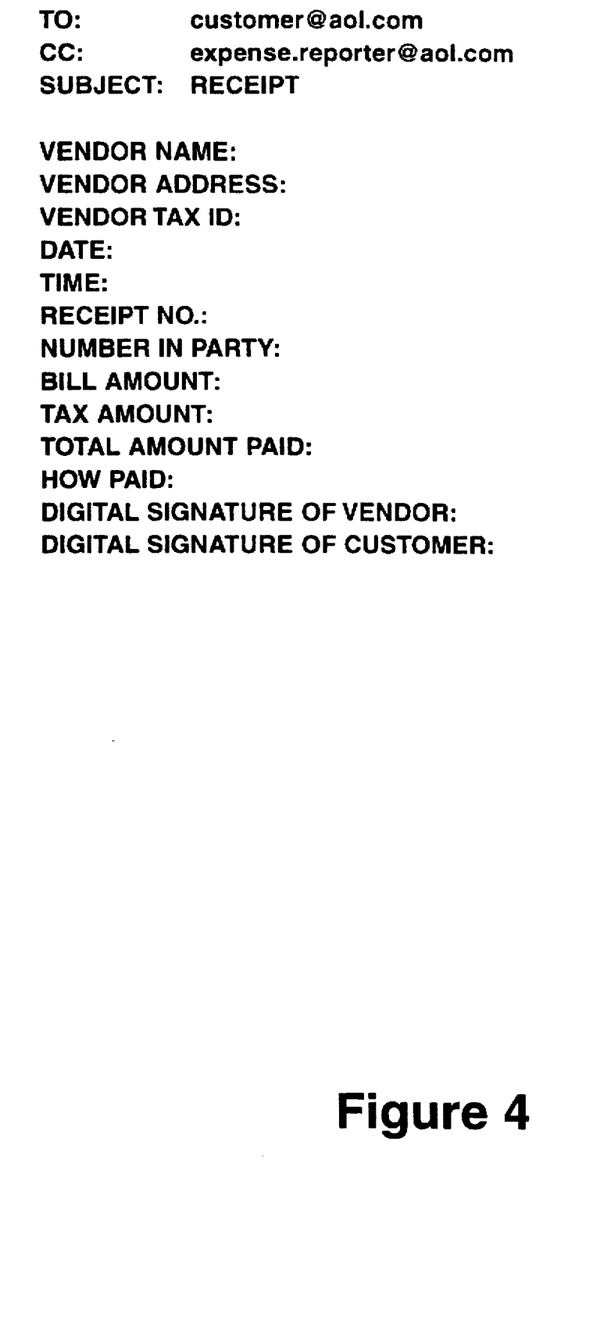
FIG. 4 is an exemplary data format for EDI.

FIG. 4 is an exemplary data format for EDI. The header shown is essentially a standard network header, such as might be utilized for an internet E-mail transaction. The second address indicates the customer's network address. The cc field indicates an optional carbon copy to a different E-mail address. The subject, may be standardized to indicate the class of E-mail message as, in this case, "receipt."

In the text of the message, a plurality of items of information are arranged in a predefined order. These include, in the example given, vendor name, vendor address, vendor tax ID, date, time, receipt number, number in party, bill amount, tax amount, total amount paid, how paid, a digital signature of the vendor and an optional digital signature of the customer. This format could be extended to include an itemization of each item purchased or each service rendered in a variable length field.

Figure 5:
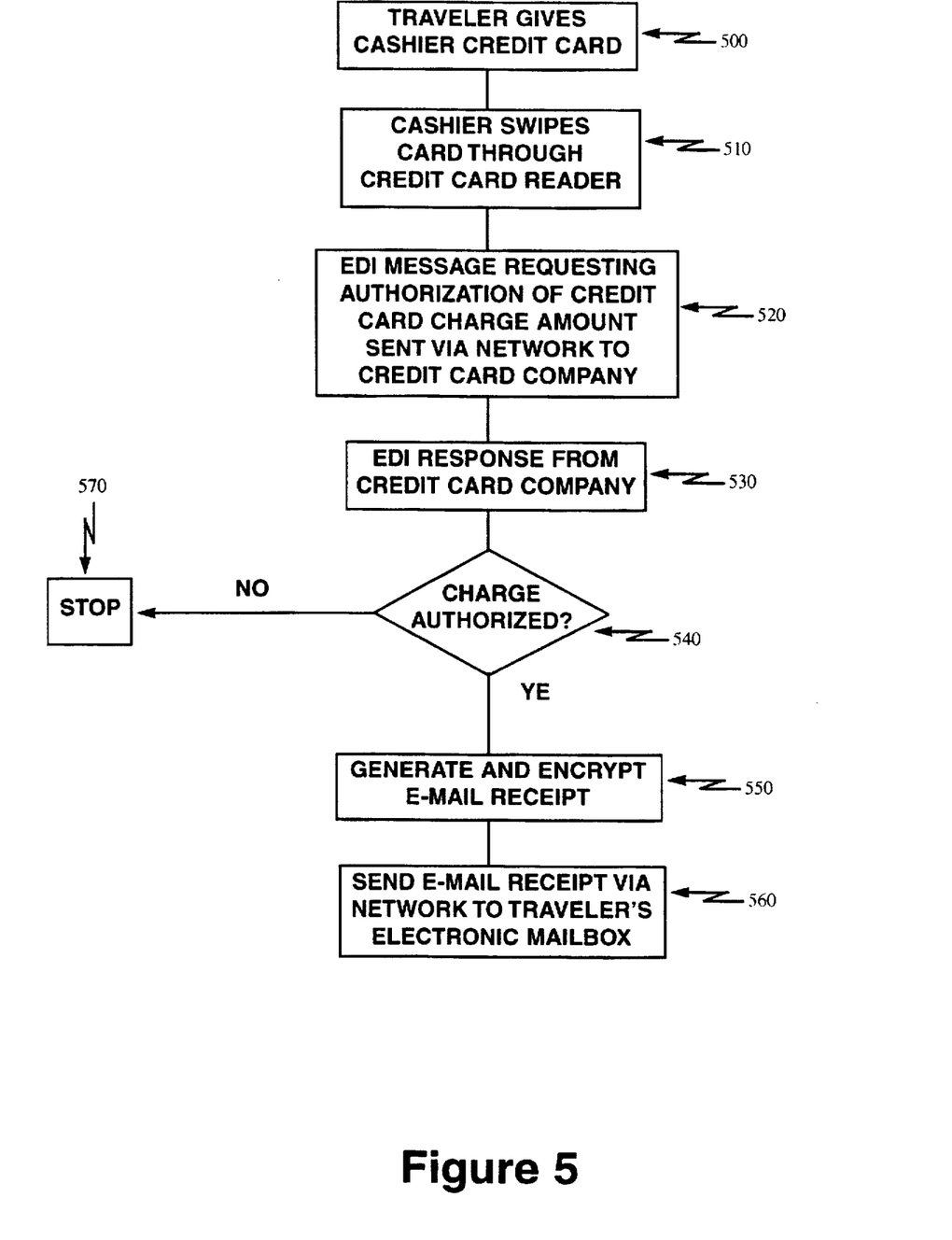
FIG. 5 is a flow chart of a process for providing effective receipts using a card containing a mail address.

FIG. 5 is a flow chart of a process for providing an electronic receipt using a card containing an E-mail address. In the example shown in FIG. 5, the card is a credit card which has been expanded to include an e-mail address for the sending of electronic receipts. However, it is clear that the general process set forth in FIG. 5 includes transactions in which payment is made by cash and in which some card, other than a credit card, is utilized to provide the E-mail address.

FIG. 5 provides a process flowchart for the scenario illustrated in FIG. 1. The traveler gives his credit card to the cashier to settle his bill (500). The cashier swipes the card through the credit card reader (510) which, in turn, generates an EDI message to the credit card authorization system requesting authorization for a specific dollar amount (520). The credit card company responds with an EDI message (530). If the response states that the charge is not authorized (540) then the transaction is halted (530). However, if the response states that the charge is authorized (540) then a digital receipt is generated and digitally signed and optionally encrypted by a computing device (550) and then delivered to the traveler's electronic address as e-mail (560) for later retrieval.

Figure 6A:
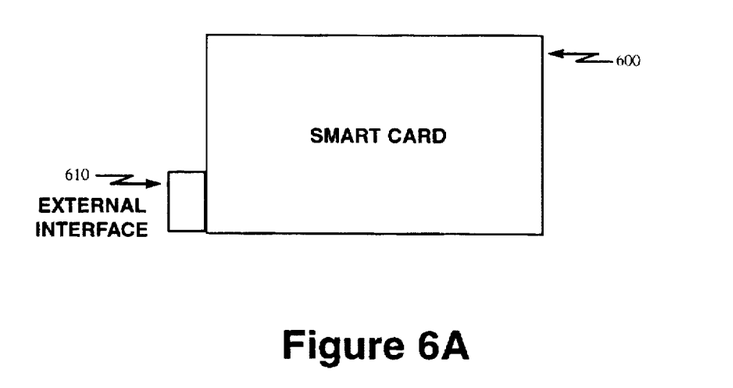
FIG. 6A illustrates the external appearance of a smart card.
Figure 6B:
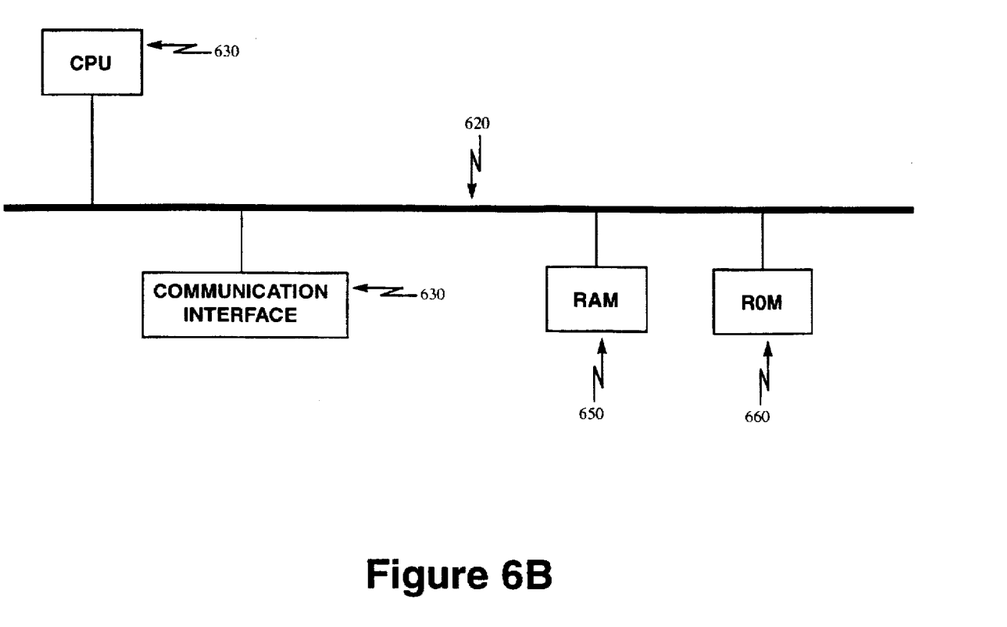
FIG. 6B illustrates an exemplary computer arrangement within a smart card.

FIGS. 6A and 6B illustrate some details of an exemplary smart card. In FIG. 6A the external view of the smart card (600) is shown. The size of the smart card is roughly equivalent to that of a credit card. However, the smart card has an external interface connector (610) to enable communication with other computing devices. In FIG. 6B the internal logical structure of the smart card is illustrated. A bus (620) allows a microprocessor (630) to fetch data and instructions stored in read only memory (ROM, 660) and random access memory (RAM, 650). Additionally, the microprocessor (630) controls the communication interface (540) which is the only path data can take to enter or exit the smart card.

Figure 7:
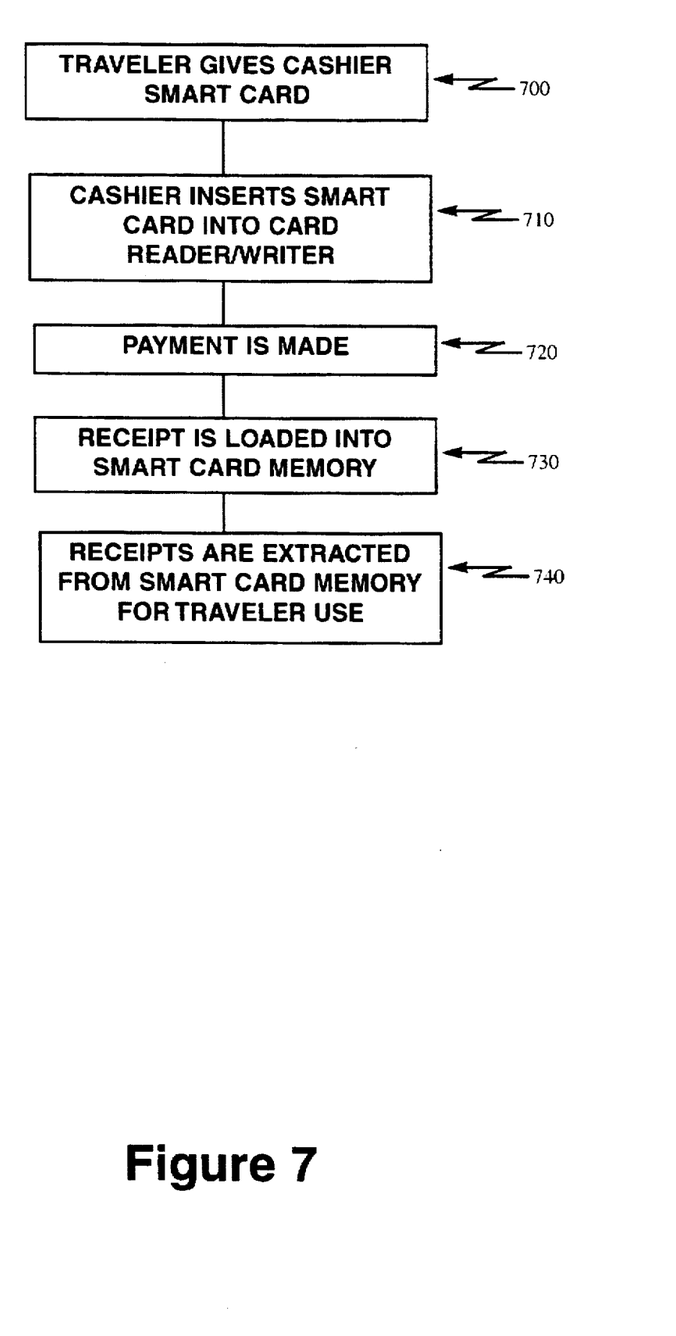
FIG. 7 is a flow chart of a process for providing electronic receipts using a smart card.

FIG. 7 is a flow chart of a process for providing electronic receipts using a smart card. In the approach illustrated in FIG. 7, a customer (e.g. traveler) gives the cashier a smart card (700) upon which a receipt is to be recorded. The cashier inserts the smart card into the card reader/writer (710) and when payment is made (720), the receipt is written into smart card memory (730). The storing of a receipt on a smart card is applicable to all types of transactions, regardless of how payment is made.

At a convenient time, such as when the traveler returns home, receipts are extracted from smart card memory and utilized to formulate an expense report and to update accounting records. Since the data structure is formalized and standardized, this can be done conveniently in an automated fashion.

Figure 8:
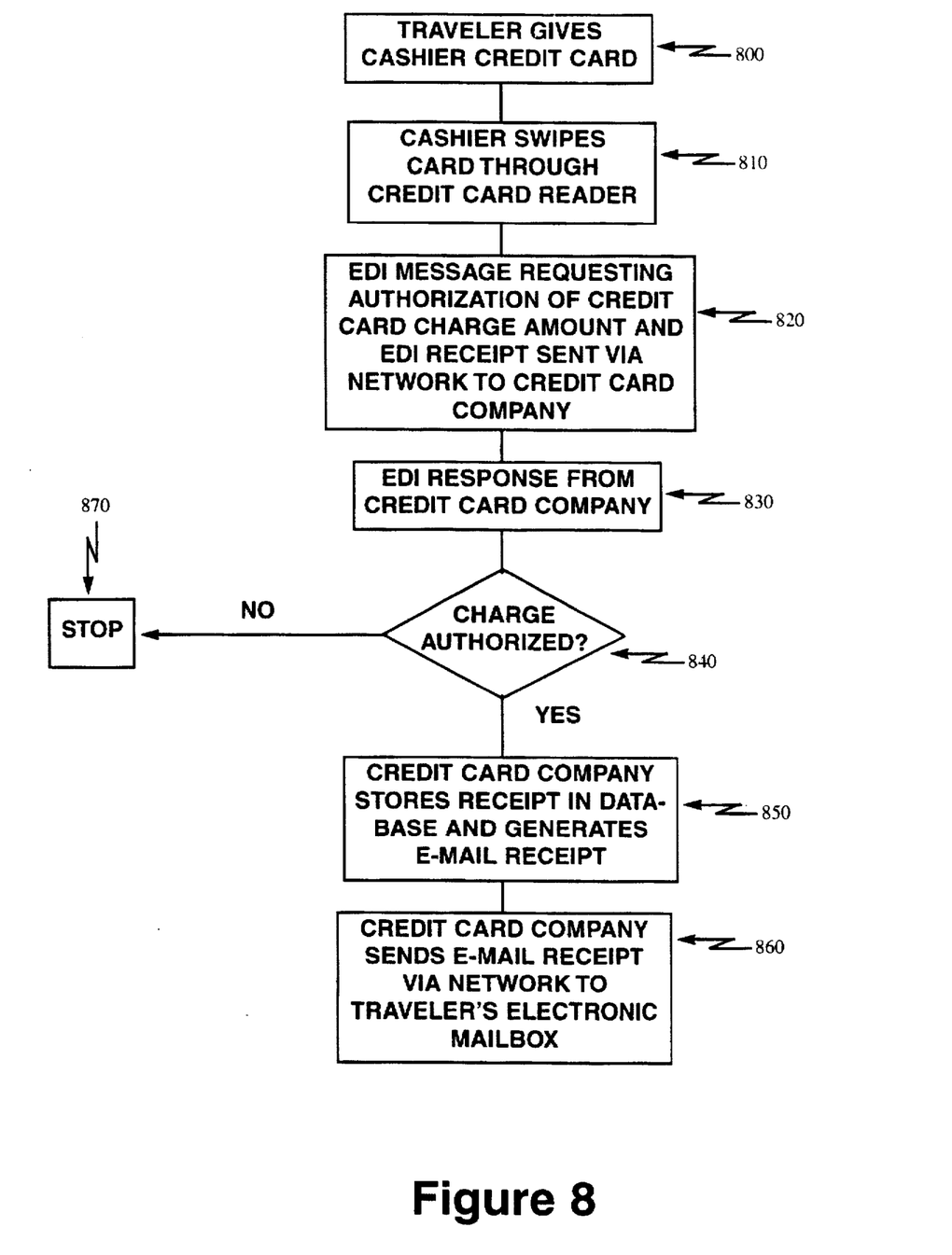
FIG. 8 is a flow chart of a process for providing electronic receipts through a credit card company.

FIG. 8 is a flowchart of a process of a third embodiment in which the credit card company issues the electronic receipt. The traveler gives his credit card to the cashier to settle his bill (800). The cashier swipes the card through the credit card reader (810) which, in turn, generates an EDI message to the credit card authorization system requesting authorization for a specific dollar amount and an EDI message which contains the receipt in digital form (830). The credit card company responds with an EDI message (830). If the response states that the charge is not authorized (830) then the transaction is halted (870). However, if the response states that the charge is authorized (840) then the credit card company stores the receipt information in a database and a digital receipt is generated, optionally encrypted, optionally digitally signed by the credit card company and/or the customer (850) and sent to the traveler's electronic address as e-mail (860) for later retrieval.

Having the credit card company issue the electronic receipts is particularly useful for vendors who are not equipped with network access. They can process their credit card transactions in the same way they now do and since the credit card company needs to computerize those transactions in some systematic way, an electric form of the transaction can be sent to the customer in the format of an electronic receipt.

There has thus been disclosed methods, apparatus, systems and computer program products for issuing electronic receipts to customers in a way which overcomes the problems of the prior art.

In this disclosure, there is shown and described only the preferred embodiment of the invention, but, as aforementioned, it is to be understood that the invention is capable of use in various other cenvinations and environments and is capable of changes or modifications within the scope of the inventive concept as expressed herein.

I claim:

1. Apparatus for handling purchase transactions, comprising:
   a. a cash register;
   b. a card reader for reading cards including at least one electronic mail address and activating said cash register to generate a receipt; and
   c. a transmitter for sending an electronic copy of said receipt to said electronic mail address.

2. The apparatus of claim 1 in which said transmitter sends said electronic copy of the receipt to said card for digital signature prior to sending said receipt to said electronic mail address.

3. The apparatus of claim 1 in which said transmitter sends said electronic copy of the receipt to said cash register for digital signature prior to sending said receipt to said electronic mail address.

4. The apparatus of claim 1 in which said transmitter sends said electronic copy of the receipt to a plurality of destinations.

5. The apparatus of claim 1 in which said transmitter sends said electronic copy of the receipt in an electronic data interchange format.

6. The apparatus of claim 1 in which said card is a smart card.

7. A method of processing purchase transactions, comprising the steps of:
   a. providing an element for performing the step of capturing an electronic mail address when processing a payment card;
   b. providing an element for performing the step of generating a receipt; and
   c. providing an element for performing the step of sending a copy of said receipt to said electronic mail address.

8. A system for processing purchase transactions, comprising:
   a. a network;
   b. a plurality of merchant terminals connected to said network, at least one of said terminals configured to include a cardreader for reading payment information and an electronic mail address from a card and for sending receipt information to the electronic mail address; and
   c. a plurality of customer terminals connected to said network, at least one of which is configured to retrieve receipt information from an electronic mail box having said electronic mail address and to process receipt information into a report summarizing purchase transactions.

9. A computer program product, comprising:
   a. one or more memory media; and
   a computer program stored on said one or more memory media, said computer program comprising instructions for capturing an electronic mail address when processing a payment card, instructions for generating a receipt, and instructions for sending a copy of said receipt to said electronic mail address.

* * * * *